United States Patent [19]

Scheier et al.

[11] 4,019,222
[45] Apr. 26, 1977

[54] POULTRY EVISCERATING METHOD AND APPARATUS

[75] Inventors: Donald J. Scheier, Kansas City; Henry E. Frederick, Parkville, both of Mo.

[73] Assignee: Gordon Johnson Company, Kansas City, Mo.

[22] Filed: Jan. 30, 1976

[21] Appl. No.: 653,666

[52] U.S. Cl. .................................. 17/11; 17/45
[51] Int. Cl.² .................................. A22C 21/00
[58] Field of Search .................... 17/11, 45

[56] References Cited
UNITED STATES PATENTS 3,886,635   6/1975   Meyn ........................... 17/11

*Primary Examiner*—Robert Peshock
*Attorney, Agent, or Firm*—Schmidt, Johnson, Hovey & Williams

[57] ABSTRACT

The digestive tract of a poultry carcass is removed for inspection without stretching the weak section of the esophagus beyond its breaking point by simultaneously pulling on the gizzard and proventriculus at opposite ends of the weak section using two separate tools. The tool which hooks beneath the proventriculus is withdrawn from the carcass at substantially the same or slightly faster rate than the tool which pulls on the gizzard and the remainder of the organs in the tract, thereby transferring stress from the weak section of the esophagus to the stronger section below the proventriculus. The tool for the gizzard comprises a generally U-shaped, open loop, while the tool for the proventriculus comprises a tongue having a bifurcated tip which can be cocked into a position for hooking beneath the proventriculus after the tongue has been fully inserted.

25 Claims, 14 Drawing Figures

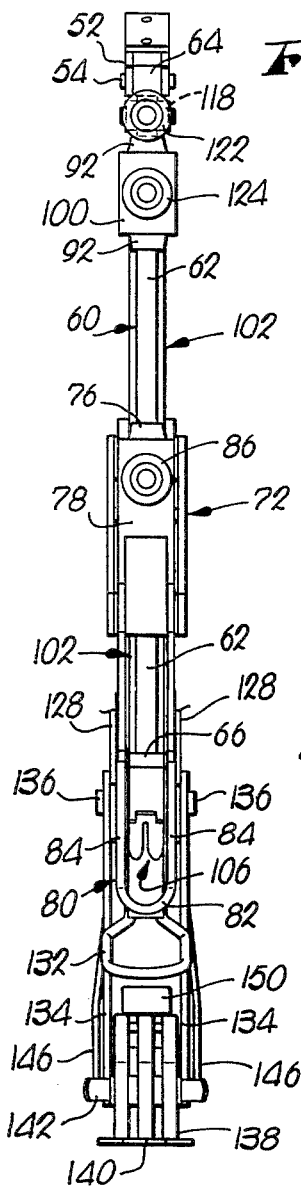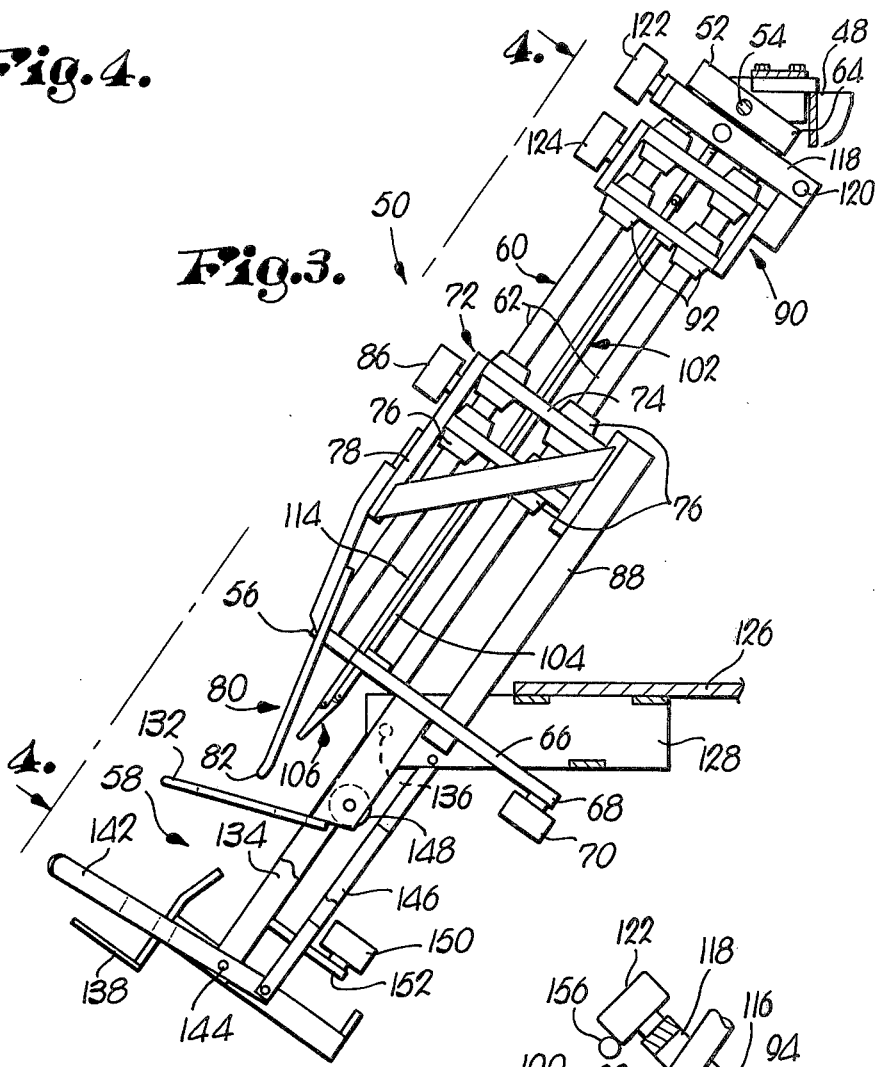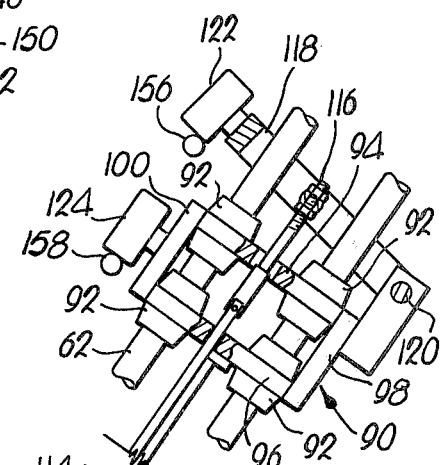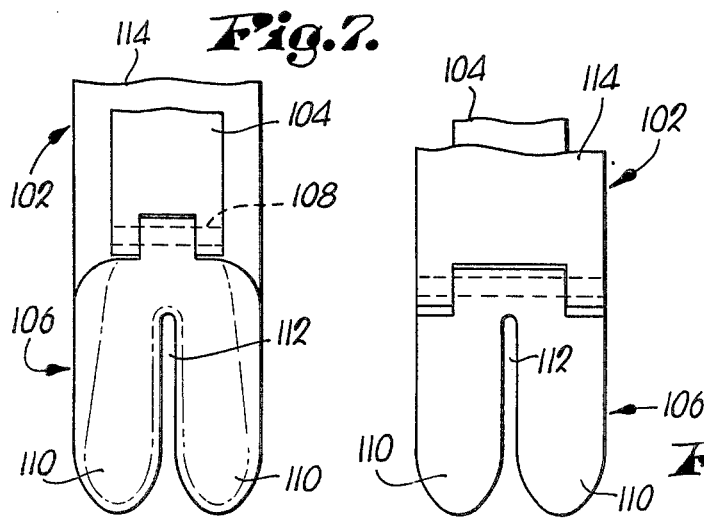

POULTRY EVISCERATING METHOD AND APPARATUS

This invention relates to that stage in a poultry processing operation following defeatheration and vent cutting where the digestive tract of the carcass, including its esophagus, proventriculus, gizzard, intestines and other organs attached to the tract are removed for inspection. It is vital that the organs only be draped over the rump of the carcass upon removal rather than separated from the carcass from which they came because otherwise the inspector has no way of determining whether or not the carcass meets required governmental standards of quality and sanitation. Since the organs dangle from the esophagus when draped for inspection, if the esophagus should tear, the organs are lost to the flush trough and the carcass must be rejected.

Dangling the organs from the esophagus in this manner places considerably strain on the esophagus, particularly a weak section located between the proventriculus (glandular stomach) and gizzard. That section of the esophagus between the crop and the proventriculus is, however, relatively strong. But typical commercial eviscerating methods presently in use make no distinction between the weak and strong sections of the esophagus, pulling only on the gizzard which often causes the "weak link" to rupture or tear. Pulling solely against the proventriculus which would in turn place the stress solely on the strong section of the esophagus is not desirable because the proventriculus is located so deeply in the carcass, below the gizzard, when the carcass is suspended by its legs, that an impractically long stroke would be required to withdraw the proventriculus far enough to also pull out the remainder of the organs. In essence, if the proventriculus alone were pulled on, the digestive tract would have to be inverted end-for-end during the withdrawal stroke before the proventriculus would actually begin pulling the other organs from the carcass. Hence, the industry has heretofore simply resigned itself to the fact that a certain number of carcass rejections due to organ losses is simply unavoidable.

An important object of the present invention is to eliminate or at least substantially reduce the number of instances in which viscera are lost before inspection in a high speed, modern processing system, thereby increasing the productivity and the efficiency of such a system to lower the cost of producing the finished product.

In accordance with the foregoing, another important object is to pull viscera for inspection in such a way that the excessive stress normally placed on the weak section of the esophagus between the proventriculus and gizzard is transferred instead to the strong section of the esophagus below the proventriculus, thereby preventing rupture of the esophagus and loss of the organs to be inspected.

A further important object is to accomplish such stress transfer by pulling on the gizzard and proventriculus with two separate tools that are withdrawn simultaneously and at such a rate that the weak section is effectively carried in toto by the two tools out of the carcass rather than being stretched within the carcass.

An additional important object of the present invention is to form the tool that engages and pulls on the gizzard in the nature of the U-shaped, open loop, while making the tool that pulls on the proventriculus in the form of a long tongue having a notched tip that can be cocked at the bottom of its stroke to hook beneath the proventriculus with the esophagus received within the notch.

Yet another important object of the present invention is to provide the foregoing loop and tongue of such design and relationship to one another that, during insertion into the carcass, they do not rupture the organs and thereby release contaminants to the otherwise edible portions of the carcass.

In the drawings:

FIG. 3 is an enlarged elevational view of one of the processing units together with its associated device for holding the carcass in place during processing;

FIG. 4 is an elevational view of the processing unit and holding device taken along line 4—4 of FIG. 3;

FIG. 5 is an enlarged, fragmentary detail view of a unit illustrating the manner in which the tip of the tongue of the unit may be cocked;

FIG. 6 is an enlarged fragmentary view of the tongue taken from the front or outside of the latter;

FIG. 7 is a view of the tongue similar to FIG. 6 but taken from the back or inside of the latter;

Figure 1:
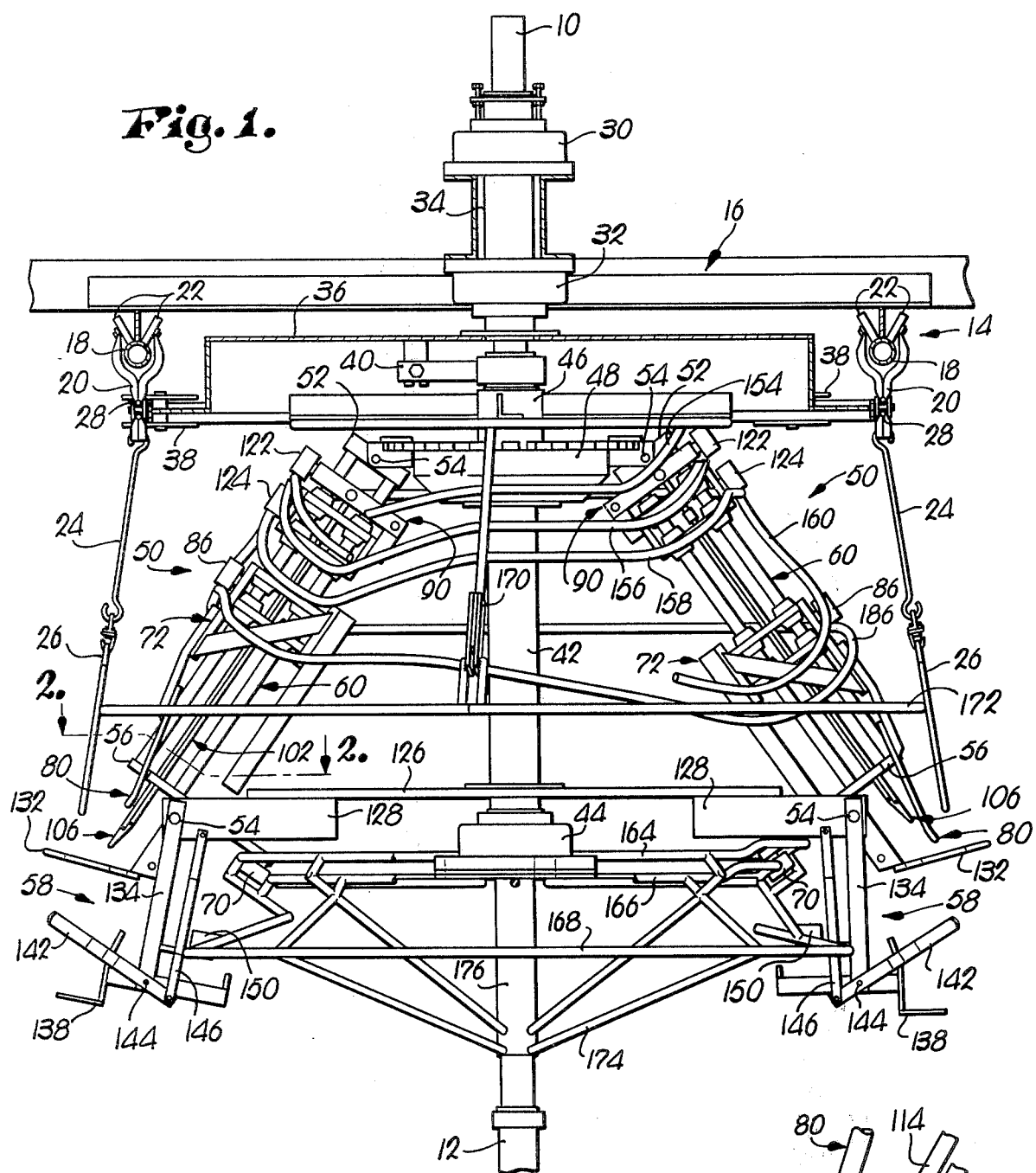
FIG. 1 is an elevational view of a machine constructed in accordance with the principles of the present invention and capable of carrying out our novel method, many of the processing units of the machine being removed for clarity.

The machine of the present invention is basically of the carousel type wherein carcasses suspended in succession from an overhead conveyor swing into units of the machine that grasp the carcasses, hold them immobile while the units continue to rotate and perform the processing functions, and then release them for continued conveyance to subsequent processing steps. With this in mind, then, the machine has a central post 10 running the full length of the machine, defining its axis of rotation, and supported by suitable structure such as a hydraulic piston and cylinder assembly 12. Actuation of piston and cylinder assembly 12 may be used to control the height of post 10.

An overhead conveyor 14 supported by superstructure 16 partially encircles the post 10 in radially spaced relationship to the latter and includes a tubular track 18 along which hangers 20 ride by way of rollers 22. Suitable drop rods 24 and shackles 26 depend from the hangers 20 for suspending the poultry carcasses, the hangers 20 of course being interconnected by a common conveying chain 28 that is only partially visible throughout the figures.

The superstructure 16 has a pair of upper bearings 30 and 32 on the axis of rotation of the machine which support a relatively short tube 34 for rotation about the upper end of the central post 10. The lower end of the tube 34 is rigidly affixed to an impulse wheel 36 having circumferentially spaced devices 38 of any suitable design around its periphery for engaging and retaining the hangers 20 as they move around the machine. Conveyor 14, therefore, serves to drive the impulse wheel 36, which in turn provides the driving power for rotating the processing units yet to be described.

The impulse wheel 36, through a suitable cranklike connector 40 or other device, transmits driving power to a relatively long tube 42 which coaxially houses the post 10 below the upper bearings 30 and 32. The upper end of the tube 42 terminates just below the upper surface of the wheel 36, while the lower end of the tube 42 terminates within a lower bearing 44 which rotatably supports the tube 42. A second lower bearing 46 adjacent the upper end of the tube 42 also helps guide the latter in its rotation with the wheel 36. An annular mounting platform 48 is secured to the tube 42 for rotation therewith a short distance below the wheel 36, and it is to the platform 48 that a number of identical processing units are attached, only two of such units being illustrated and both being designated by the numeral 50.

Each unit 50 slopes downwardly and outwardly from the platform 48 with its upper end 52 swingably mounted on the platform 48 by a pivot 54 and its lower end 56 terminating just above a device 58 that serves to hold the carcass in place for the unit 50 during processing. As will become apparent, each unit 50 and corresponding device 58 are mechanically separate mechanisms which cooperate with one another during processing but which do not swing together about the upper pivot 54.

Each unit 50 has a main frame 60 that includes a pair of long sloping guide shafts 62 held in parallel but spaced apart relationship by a short upper cross member 64 (receiving pivot 54) and a longer, lower cross member 66 at lower end 56. The inner end 68 of lower cross member 66 carries a rotatable cam follower 70. A first subframe 72 is guided by shafts 62 for up-and-down movement along the latter, having a pair of vertically spaced upper cross pieces 74 that carry anti-friction sleeves 76 which receive the shafts 62. A frontpiece 78 of the subframe 72 supports a removal tool in the form of a generally U-shaped rigid loop 80 shown in front elevation in FIG. 4. The loop 80 has an arcuate bight 82 at its lower end that is outturned slightly from and interconnects the two legs 84 of the loop 80. A rotatable cam follower 86 is mounted on frontpiece 78, and a depending guide bar 88 is attached to the inner ends of upper cross pieces 74 and extends downwardly therefrom along the inside of the frame 60.

A second subframe 90, shown in detail in FIGS. 3 and 5, is also mounted for reciprocation along the main frame 60 by virtue of antifriction sleeves 92 carried by the top and bottom elements 94 and 96 respectively of the subframe 90. Inner and outer elements 98 and 100 of the subframe 90 complete the latter's basic box-like construction. A second removal tool in the form of a long tongue 102 is carried by the subframe 90 for reciprocation with the latter along the main frame 60, the tongue 102 extending downwardly through and beyond the cross pieces 74 of subframe 72 and the cross member 66 of main frame 60 for movement relative to such structures. The upper end of the stationary part 104 of tongue 102 is fixed to the lower element 96 of the subframe 90 and has a special bifurcated tip 106 swingably joined to its lower end by a pivot 108 (details in FIGS. 6 and 7). The spaced furcations 110 of the tip 106 define a clearance notch 112 therebetween for a purpose which will hereinafter be made apparent.

The tip 106 may be swung about the pivot 108 to a cocked position as illustrated for example in FIG. 5. Such cocking is accomplished by virtue of an outer link 114 of the tongue 102 which extends upwardly through the subframe 72 and elements 94 and 96 of subframe 90, finally terminating with an anchor bolt 116 carried by a trigger frame 118 above the element 94 of subframe 90. The trigger frame 118 is swingably mounted on the inner element 98 of the subframe 90 by a pivot 120 a shown best in FIG. 5 such that rocking the trigger frame 118 between the stand-by and operated positions illustrated in FIGS. 3 and 5 respectively strightens or cocks the tip 106. A rotatable cam follower 122 projecting outwardly from the trigger frame 118 serves as the means for receiving the force necessary to actuate the trigger frame 118, and another rotatable cam follower 124 projecting outwardly from the front element 100 serves a similar function for the subframe 90.

Figure 2:
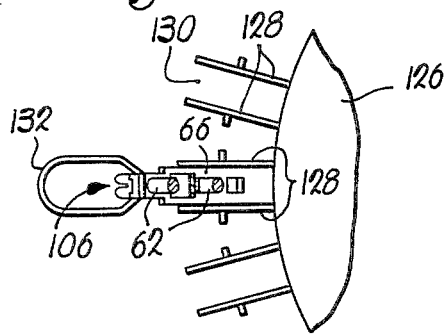
FIG. 2 is a fragmentary detail view taken substantially along sight line 2—2 of FIG. 1 illustrating details of construction.

In addition to the processing units 50, the main rotatable tube 42 of the machine also carries the holding or clamping devices 58 for rotation in registration with their respective processing units 50. This is accomplished by way of a circular plate 126 that is rigidly affixed to the tube 42 adjacent its lower end and just above the lower bearing 44. Circular plate 126, as shown in FIG. 2 as well as FIGS. 1 and 3, has circumferentially spaced pairs of mounting bars 128 that project radially from the periphery of plate 126, the number of pairs being determined by the number of devices 58 and units 50 on the machine. The space 130 between each pair of mounting bars 128 receives the lower end 56 of the corresponding unit 50 to allow the latter to move freely in and out about its pivot 54 in response to forces applied against the cam follower 70. Fixed to the outer ends of each pair of bars 128 and depending therefrom is a positioning member 132 in the nature of a rigid loop which fits between the legs of a carcass when the latter is suspended from shackle 26. Also depending from each pair of bars 128 on opposite sides of the positioning loop 132 is a pair of straps 134 which are swingably mounted at their upper ends to the bars 128 by pivots 136. The straps 134 in turn carry a generally L-shaped shoulder support 138 for the carcass at their lowermost ends, the support 138 having a central opening 140 for clearing the neck of the carcass. A yoke-like wing clamp 142 is swingably mounted on the lower ends of straps 134 by pivots 144, and actuating links 146 connect the innermost end of clamp 142 with the stationary mounting bars 128 such that the clamp 142 swings about pivots 144 in response to in-and-out swinging of the device 58 about its pivots 136. This motion may be seen by comparing FIG. 1 with FIG. 3, for example. A roller 148 (FIG. 3) is rotatably carried by the inner end of the positioning loop 132 in a disposition to engage the guide member 88 of subframe 72 as the latter moves in its down stroke toward device 58, and a rotatable cam follower 150 is carried by a rearwardly extending bracket 152 between straps 134 for receiving forces which control the swinging position of the device 58 about its pivots 136.

The units 50 and devices 58 are actuated during their rotation about the center post 10 by stationary cam structure which will now be described. With reference to FIG. 1, and working from the top down, the follower 122 of trigger frame 118 is confined between a pair of stationary cam rods 154 and 156 which wind in a conical fashion around the central axis of the machine. The follower 124 of subframe 90 is confined between the cam rod 156 and another cam rod 158 which also winds around the axis of the machine. The follower 86 on subframe 72 is confined between an upper cam rod 160 and a lower cam rod 162, the upper rod 160 winding only partially around the machine while the lower rod 162 makes a complete loop. Below the plate 126, a pair of upper and lower cam rods 164 and 166 respectively confine the follower 70 of the main frame 60, while still further below plate 126, a single cam rod 168 is disposed to engage the follower 150 of the swingable holding device 58. All of the cam rods 154–162 are structurally tied back to the superstructure 16 by various members such as member 170 in the center of the machine in FIG. 1, the member 170 and others also supporting a circular guide rod 172 against which the shackles 126 slide as they move around the machine. The cam rods 164, 166 and 168 below the plate 126 are all structurally tied back to the superstructure 16 through various structural members such as 174 and 176.

OPERATION

Figure 9:
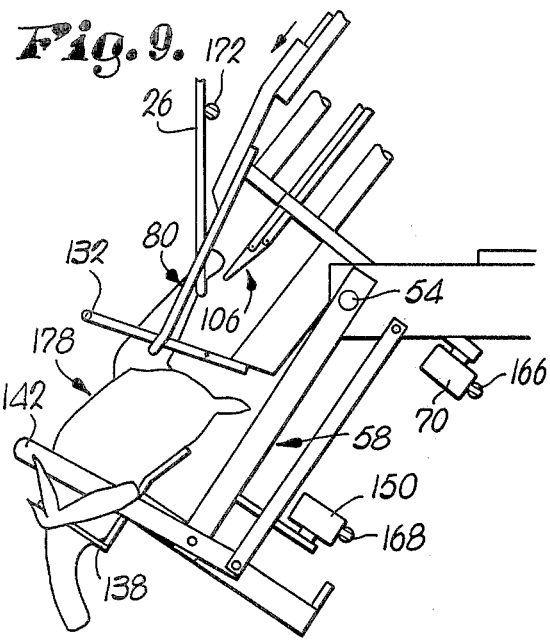
FIGS. 9-14 are schematic, diagramatic views illustrating the sequence of operating steps used in carrying out the method of the present invention.

The operation of the machine and the unique method which it presents may be perhaps best understood by giving particular attention to FIGS. 9-14 wherein components of the machine at various stages throughout the procedure are illustrated. The loop 80 and the tongue 102 await the incoming carcass 178 at locations considerably above those illustrated in FIG. 9 in order to provide clearance for the carcass 178 as its shackle 26 swings into position against the guide rod 172. That "receiving" condition is illustrated by the unit 50 on the right side of the machine in FIG. 1 which also illustrates the corresponding holding device 58 in a virtually upright condition at that time with its wing clamp 142 raised. As the carcass 178 swings into position with its legs straddling the positioning loop 132 and its shoulders against the support 138, the cam rod 168 pushes follower 150 outwardly such as to swing the device 58 up and out, causing the wing clamp 142 to swing down and over the tops of the wings of the carcass 178 until the condition of FIG. 9 is reached. At this time the carcass 178 is well held against further substantial movement relative to the processing unit 50 and the holding device 58.

Of course, the cam rod 166 engages the follower 70 of main frame 60 at this time so as to position the loop 80 and tongue 102, in an in-and-out direction with respect to the machine, in alignment with an opening which has previously been cut at the vent of the carcass 178.

It is perhaps best pointed out at this time that throughout FIGS. 9-14, the loop 80 and tongue 102 remain always in solid lines in spite of the fact that much of their movement is within the carcass 178 and hence hidden from view. Such has been done to most graphically and fully convey the special movements of the loop 80 and tongue 102 and should not be taken to mean that such tools are somehow outside of the carcass 178 when their movement would in fact place them deep within the same.

Figure 10:
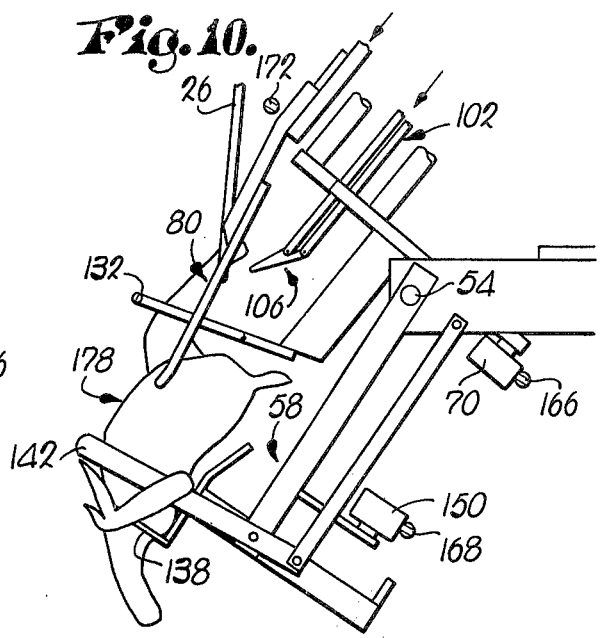

As the unit 50 and device 58 move around the machine (from right to left viewing FIG. 1), the cam followers 122, 124 and 86 move down their respective sloping cam tracks defined by the rods 154-162 20 that the loop 80 and tongue 102 move progressively closer to the vent of the carcass 178 until loop 80 actually enters the latter as illustrated in FIG. 10. By the time the FIG. 10 condition is reached, the rod 166 and its follower 70 have caused main frame 60 to be swung outwardly to a slight extent such that the loop 80 follows the breast of the carcass 178 during further movement along its insertion stroke. Also by this time the cam rod 156, working against its follower 122, has actuated the trigger frame 118 to a slight extent in order to partially cock the tip 106 of the tongue 102. This latter movement serves to facilitate entry of the tip 106 into the carcass 178 as the tongue 102 continues its insertion stroke.

Figure 11:
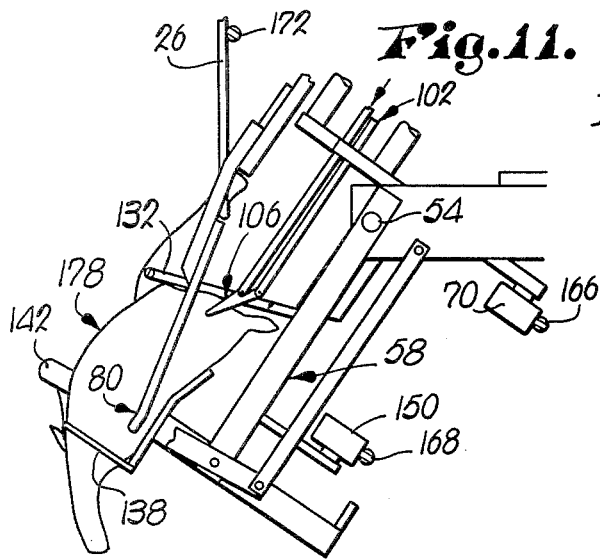

By the time the unit 50 has reached the condition in FIG. 11, the rod 166 and follower 70 have allowed the main frame 60 to swing back inwardly a slight extent, thereby swinging the loop 80 and the tongue 102 closer to the back of the carcass 178. The loop 80 has completed its insertion stroke by this time and will progress no further into the carcass 178. The tip 106 of the tongue 102 is just entering the carcass 178.

Figure 8:
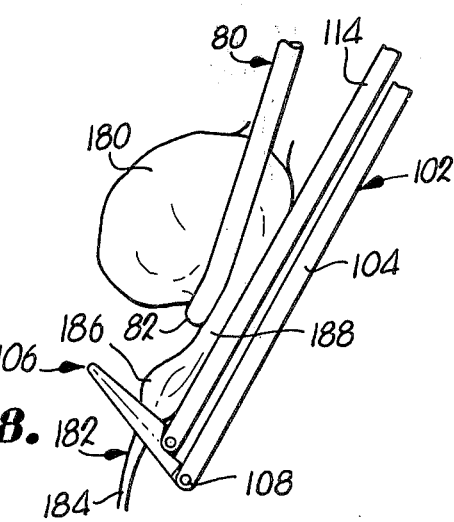
FIG. 8 is a fragmentary view of the tongue and removal loop with which it cooperates illustrating the manner in which such tools pull on the digestive tract of the carcass during evisceration.

Entry of the loop 80 along the breast of the carcass and then subsequent movement toward its backbone enables the bight 82 of the loop 80 to be slipped over and under most of the organs in the digestive tract. Upward movement of the loop 80 along its withdrawal stroke will therefore cause the bight 82 to engage the bottom of the gizzard 108 as illustrated in FIG. 8.

Figure 12:
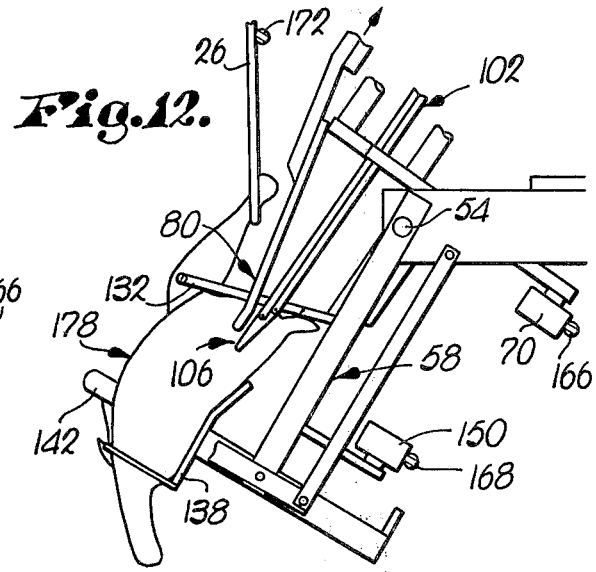

Therefore, as the loop 80 withdraws from its FIG. 11 to its FIG. 12 position, it pulls on the digestive tract using the gizzard 180. This motion extends the esohagus 182 as shown in FIG. 8 which has a relatively strong section 184 below the bulb-like proventriculus 186 and a relatively weak section 188 that connects the proventriculus 186 to the gizzard 180.

Figure 13:
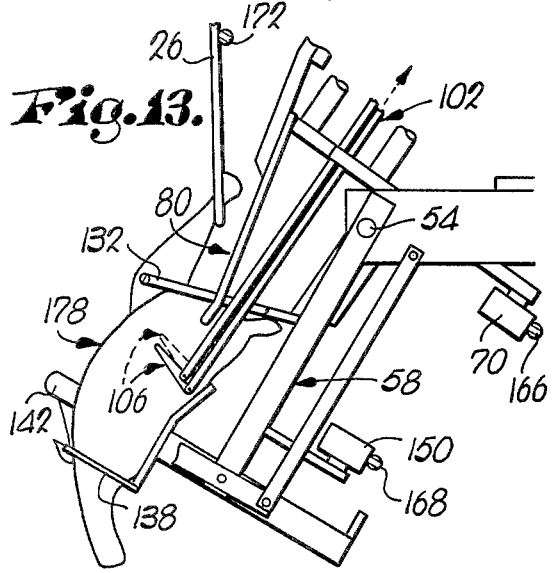

By the time the loop 80 has withdrawn to the position of FIG. 12, the tip 106 of the tongue 102 has been uncocked by the trigger frame 118 to facilitate further insertion of the tongue 102 to the point illustrated in FIG. 13. The loop 80 dwells at its FIG. 12 position during such further insertion of the tongue 102.

When the tongue 102 reaches the lower limit of its insertion stroke as illustrated in FIG. 13, the trigger frame 118 is again actuated by cam rod 156 and follower 122 to fully cock the tip 106. As the tip 106 cocks, the strong section 184 of the esophagus 182 is received within the notch 112 between opposite furcations 110 of the tip 106. Initiation of the withdrawal stroke of the tongue 102, then, causes the proventriculus 186 to seat firmly against the tip 106 such that the tongue 102 begins pulling against the proventriculus 186. Slight upward movement of the tongue 102 to place the tip 106 in the dotted line position of FIG. 13 while the loop 80 remains stationary relaxes the tension in the weak section 188 of the esophagus 182.

Figure 14:
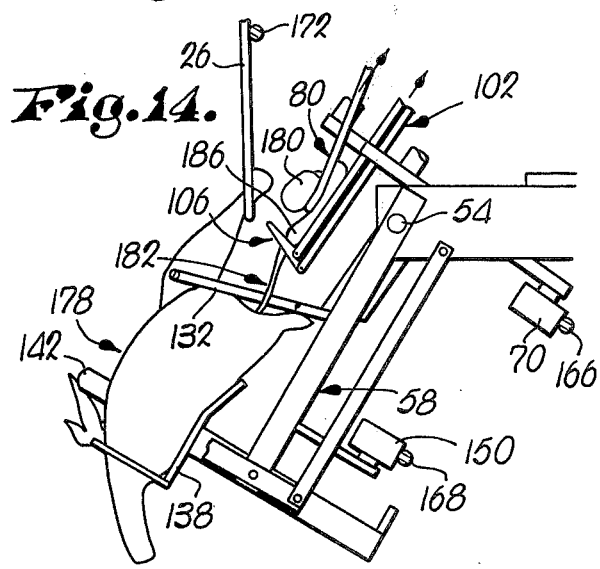

Thereupon, the loop 80 and the tongue 102 withdraw from the carcass 178 as shown in FIG. 14, such withdrawal being in unison and at substantially the same rate. The loop 80 and the tongue 102 are then acutated in such a way that the removed organs are released and draped over the rump of the carcass 178, hanging by the esophagus 182.

This joint action on the part of the tongue 102 and the loop 80 assures that stress otherwise imparted to the weak section 188 of the esophagus 182 is instead transferred to the strong section 184. While the weak section 188 can withstand a limited amount of stretching, such as to raise the gizzard 180 to a point just inside the carcass 178 such as in FIGS. 12 and 13, further stretching beyond that point might stretch section 188 beyond its breaking point, causing the organs to be dropped into the flush trough and lost for inspection.

But by stopping the stretching of section 188 prior to its breaking point and by transferring its stress to the strong section 184 through tongue tip 106 and the proventriculus 186, the organs cn be completely removed and draped for inspection without breaking the esophagus 182. By utilizng the inherent ability of the strong section 184 to stretch without breaking, rather than risking breakage of the "weak link" section 188, the reliability of the machine is markedly increased, and as a consequence, so are productivity and efficiency.

It should be noted in passing that it may be desirable in certain instances to provide the bight 82 of the loop 80 with scraping nibs or the like (not shown) along the backside of the bight 82 for the purpose of scraping along the back of the carcass 178 during the withdrawal stroke to dislodge lungs and other organs which are nested tightly within sockets along the back. In many instances, such dislodgement of the lungs may not be desirable during the removal of the digestive tract because of the difficulty in extracting the dislodged lungs from the carcass 178 at such time.

Having thus described the invention, what is claimed as new and desired to be secured by Letters Patent is:

1. In an eviscerating machine for automatically removing the digestive tract from a poultry carcass through an opening at the vent of the carcass:
   means for holding the carcass against substantial movement and with its opening in a predetermined position;
   a pair of separate removal tools each shiftable relative to said holding means through insertion and withdrawal strokes disposed to move the same into the carcass through said opening and subsequently back out of the carcass through the opening.
   each of said tools having structure enabling the same to pull on the tract and thereby remove the latter from the carcass as the tools move through their withdrawal strokes; and
   mechanism for positioning said tools at spaced locations along the tract and for moving the tools through their withdrawal strokes at a rate which pulls the tract from the carcass without rupturing the tract at a point between said locations.

2. In an eviscerating machine as claimed in claim 1, wherein one of said tools comprises a generally U-shaped, rigid loop, said structure including the bight of said loop.

3. In an eviscerating machine as claimed in claim 1, wherein one of said tools comprises a rigid tongue having a bifurcated tip shiftable to a cocked position, said structure including said tip.

4. In an eviscerating machine as claimed in claim 3, wherein the other of said tools comprises a generally U-shaped, rigid loop, said structure including the bight of said loop.

5. In an eviscerating machine as claimed in claim 1, wherein said mechanism includes means for trailing one of said tools with respect to the other during their insertion strokes, reversing their relationship within the carcass, and then trailing said one tool with respect to the other during their withdrawal strokes.

6. In an eviscerating machine as claimed in claim 5, wherein said one tool comprises a tongue having a tip which is shiftable to a cocked position, said mechanism further including means for shifting said tip to its cocked position during said reversal of relationship between the tools and maintaining the tip cocked during the withdrawal stroke of the tongue, said structure including said tip.

7. In an eviscerating machine as claimed in claim 6, wherein said first-mentioned means of the mechanism is operable to begin the withdrawal stroke of said other tool before that of said tongue.

8. In an eviscerating machine as claimed in claim 7, wherein said tip of the tongue is bifurcated, presenting a notch for receiving the tract during the withdrawal stroke of the tongue.

9. In an eviscerating machine as claimed in claim 8, wherein said other tool comprises a generally U-shaped rigid loop, said structure including the bight of said loop.

10. In an eviscerating machine as claimed in claim 1, wherein said carcass holding means and said tools are mounted for continuous movement in unison along a fixed path of travel throughout the evisceration process.

11. In an eviscerating machine as claimed in claim 10, wherein said tools are mounted on a common frame and each is provided with its own subframe shiftable independently of the other along said frame for movement of the tools in their respective insertion and withdrawal strokes.

12. In an eviscerating machine as claimed in claim 11, wherein said mechanism includes stationary cams for said tools and cam followers on said subframes disposed for engagement with said cams during movement of the frame along said path of travel.

13. In an eviscerating machine as claimed in claim 12, wherein one of said tools comprises a tongue having a tip swingable to a cocked position, said subframe of the tongue having a shiftable trigger thereon operably coupled with said tip, said mechanism further including a cam follower on said trigger and a stationary cam disposed to actuate the trigger and thereby cock said tip when the tongue is at the completion of its insertion stroke.

14. In an eviscerating machine as claimed in claim 13, wherein said cams and cam followers are disposed to trail said tongue behind the other tool during their insertion strokes, reverse their relationship within the carcass, and trail the tongue behind the other tool during their withdrawal strokes.

15. In an eviscerating machine as claimed in claim 14, wherein said cams and cam followers are further disposed to begin the withdrawal stroke of said other tool before that of said tongue.

16. In an eviscerating machine as claimed in claim 15, wherein said tip of the tongue is bifurcated, presenting a notch for receiving the tract during the withdrawal stroke of the tongue.

17. In an eviscerating machine as claimed in claim 16, wherein said other tool comprises a generally U-shaped, rigid loop, said structure including the bight of said loop.

18. In an eviscerating machine as claimed in claim 16, wherein said frame is swingable relative to said carcass holding means and is provided with a cam follower; and a stationary cam disposed for engagement with said follower of the frame for swinging the loop and the tongue away from the back of the carcass and toward the breast of the latter during the insertion stroke of the loop.

19. A method of removing the digestive tract from a poultry carcass without rupturing the tract where the latter includes a duct having a relatively strong section leading to a first organ of the tract and a relatively weak section departing from said first organ and leading to a second organ of the tract, said method including the steps of:

exerting a pair of separate withdrawal forces on the tract from beneath and against said first and second organs with respect to the direction of withdrawal, the force against said first organ being disposed to pull on said strong section of the duct and the force against said second organ being disposed to pull on said weak section of the duct; displacing said forces in unison in the direction of withdawal and at a rate which relieves stress in said weak section and concentrates stress in said strong section; and discontinuing said exerting and displacing steps when the tract is sufficiently withdrawn from the carcass to drape the tract over the outside of the carcass.

20. A method of removing the digestive tract from a poultry carcass as claimed in claim 19, and displacing the force against said first organ slightly in the direction of withdrawal while maintaining the force against said second organ stationary prior to said displacement in unison whereby to initially relax said weak section.

21. A method of removing the digestive tract from a poultry carcass as claimed in claim 20; and displacing the force against said second organ a predetermined amount in the withdrawal direction prior to exerting the force against said first organ.

22. A method of removing the digestive tract from a poultry carcass as claimed in claim 21; and continuously advancing the carcass along a predetermined path of travel during all displacing and exerting steps.

23. A method of removing the digestive tract from a poultry carcass as claimed in claim 22; and simultaneously with displacing the force against the second organ in the withdrawal direction, applying a scraping force along the back of the carcass to dislodge the lungs.

24. A method of removing the digestive tract from a poultry carcass as claimed in claim 19; and continuously advancing the carcass along a predetermined path of travel during all displacing and exerting steps.

25. A method of removing the digestive tract from a poultry carcass as claimed in claim 19, wherein said displacement rate is substantially the same for both forces.

* * * * *